(12) United States Patent
Wisler

(10) Patent No.: US 7,688,862 B2
(45) Date of Patent: Mar. 30, 2010

(54) SYSTEMS AND METHODS FOR THE SYNCHRONIZATION OF A REAL-TIME SCHEDULED PACKET NETWORK USING RELATIVE TIMING

(75) Inventor: Dale J. Wisler, Atkinson, NH (US)

(73) Assignee: Avaya Inc., Basking Ridge, NJ (US)

( * ) Notice: Subject to any disclaimer, the term of this patent is extended or adjusted under 35 U.S.C. 154(b) by 1616 days.

(21) Appl. No.: 10/900,986

(22) Filed: Jul. 28, 2004

(65) Prior Publication Data

US 2005/0063383 A1   Mar. 24, 2005

Related U.S. Application Data

(60) Provisional application No. 60/490,609, filed on Jul. 28, 2003.

(51) Int. Cl.
*H04J 3/06* (2006.01)
*H04L 12/28* (2006.01)

(52) U.S. Cl. .................... 370/503; 370/395.62
(58) Field of Classification Search ........................ None
See application file for complete search history.

(56) References Cited

U.S. PATENT DOCUMENTS

| | | | | |
|---|---|---|---|---|
| 4,042,781 A | * | 8/1977 | Dragotinov | 370/507 |
| 4,622,665 A | * | 11/1986 | Jonsson et al. | 370/516 |
| 5,790,608 A | | 8/1998 | Benayoun et al. | 375/376 |
| 6,381,218 B1 | * | 4/2002 | McIntyre et al. | 370/245 |
| 6,714,563 B1 | * | 3/2004 | Kushi | 370/503 |
| 6,728,781 B1 | * | 4/2004 | Aguilera et al. | 709/240 |
| 6,775,300 B2 | * | 8/2004 | Kuo | 370/503 |
| 6,816,510 B1 | | 11/2004 | Banerjee | 370/503 |
| 7,020,076 B1 | * | 3/2006 | Alkalai et al. | 370/217 |
| 7,142,501 B1 | * | 11/2006 | Barrass et al. | 370/201 |
| 2001/0038646 A1 | * | 11/2001 | Van Der Putten et al. | 370/503 |
| 2003/0210713 A1 | * | 11/2003 | Abdel-Ghaffar | 370/503 |
| 2004/0095963 A1 | * | 5/2004 | Rakib | 370/503 |

\* cited by examiner

*Primary Examiner*—Chi H Pham
*Assistant Examiner*—Warner Wong
(74) *Attorney, Agent, or Firm*—Chapin IP Law, LLC; David W. Rouille, Esq.

(57) ABSTRACT

A node of a real-time scheduled packet network synchronizes an internal frequency reference to a master node by receiving first heartbeat packets that are transmitted by the master node at a predetermined frequency. The node calculates a link phase of a link over which the first heartbeat packets are received by subtracting a time at which the node transmitted a second heartbeat packet to another node from a time at which the node received a first heartbeat packet.

13 Claims, 6 Drawing Sheets

SYSTEMS AND METHODS FOR THE SYNCHRONIZATION OF A REAL-TIME SCHEDULED PACKET NETWORK USING RELATIVE TIMING

CROSS-REFERENCE TO RELATED APPLICATIONS

This application claims the benefit of U.S. Provisional Application No. 60/490,609 titled "Systems and Methods for the Synchronization of a Real-Time Scheduled Packet Network Using Relative Timing," filed Jul. 28, 2003.

STATEMENT REGARDING FEDERALLY SPONSORED RESEARCH OR DEVELOPMENT (Not applicable)

BACKGROUND OF THE INVENTION

The present invention relates generally to the implementation of a mechanism to synchronize a Real-Time Scheduled Packet Network. A Real-Time Scheduled Packet Network requires precise synchronization to ensure that packets transmitted at a precise time arrive at the next receiver at a predetermined time.

Many types of networks require synchronization; most require that the timing in each of the network elements is frequency-synchronized, but Real-Time Scheduled Packet Networks require both frequency synchronization and phase information.

BRIEF SUMMARY OF THE INVENTION

The present invention uses a novel approach to achieve phase alignment. Rather than requiring Global Positioning System (GPS) receivers in each network element, or by measuring propagation delay of each link, the present invention uses periodic synchronization packets (called Heartbeats) to synchronize transmitters and receivers in the network. These Heartbeats do not contain any timestamps. Furthermore, the timing sources in each network element do not need to be aligned in phase. Instead, the relative phase of each link is determined. This relative phase is called "Link Phase."

The present invention allows any link to have asymmetric propagation delay, that is, the propagation delay from Point A to Point B can be significantly different from the propagation delay from Point B to Point A. Asymmetric propagation delay is common in certain types of transmission topologies, such as unidirectional path switched rings.

BRIEF DESCRIPTION OF THE DRAWINGS

These and other features, advantages, aspects and embodiments of the present invention will become more apparent to those skilled in the art from the following detailed description of an embodiment of the present invention when taken with reference to the accompanying drawings, in which.

DETAILED DESCRIPTION OF THE INVENTION

U.S. Provisional Patent Application No. 60/490,609, titled "Systems and Methods for the Synchronization of a Real-Time Scheduled Packet Network Using Relative Timing," filed Jul. 28, 2003, and U.S. patent application Ser. No. 09/746,744, titled "Scheduled Network Packet Switch," filed Dec. 22, 2000, are hereby incorporated by reference herein.

The present invention provides techniques, in which the heartbeats of switches are not adjusted in phase. In accordance with the presently disclosed techniques, Link Phase provides a per-link adjustment in this regard.

The present disclosure has two main parts: Frequency Synchronization and Link Phase Calculation.

1. Frequency Synchronization

All Scheduled Switch/Routers (SSRs) and Scheduled End Points (SEPs) (collectively referred to herein as "nodes") in a scheduled network are synchronized in frequency by the distribution of synchronization packets called Heartbeats. Frequency synchronization is used to overcome the variation of individual frequency references in each SSR and SEP. All individual frequency references are synchronized to the same frequency. Frequency synchronization is based on the frequency of arriving heartbeats, which is an inverse of the time period between heartbeats.

Figure 1:
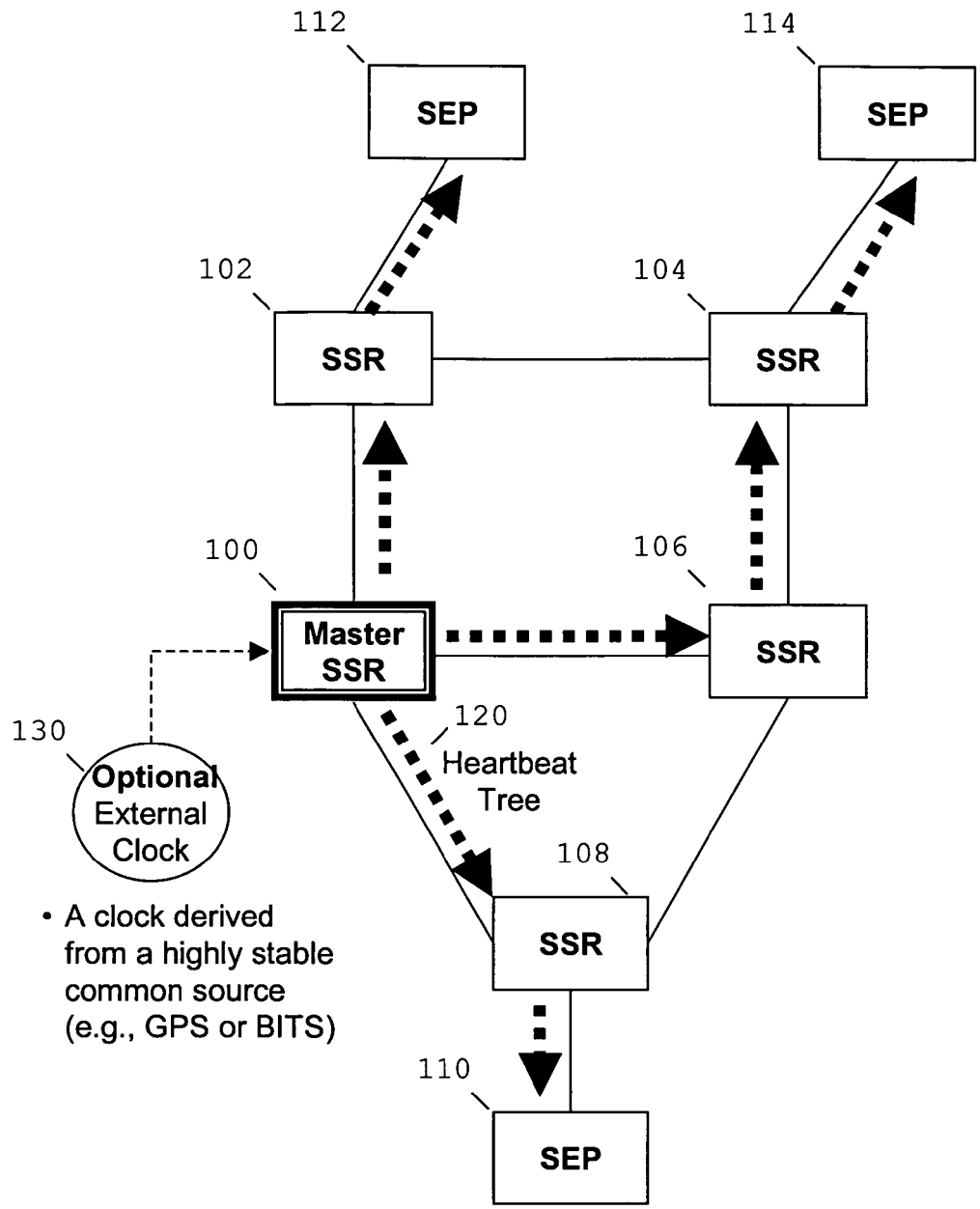
FIG. 1 is a block diagram showing an example of a heartbeat distribution tree having one Master Scheduled Switche/Router (SSR), in accordance with an illustrative embodiment of the disclosed system.

At least one SSR is selected to be a "Master" SSR. The SEPs and the other SSRs are synchronized, in frequency, to the Master SSR(s). A "Heartbeat tree" is created for each Master SSR. A Heartbeat tree is the set of paths that distributes Heartbeats from each Master SSR to all SEPs and the other SSRs. The Master SSR forms a root of a Heartbeat tree. FIG. 1 shows an example of a scheduled network with a single Master SSR 100, non-master SSRs 102, 104, 106 and 108, SEPs 110, 112 and 114, an optional external clock 130 and a heartbeat tree 120. A single Master SSR can be synchronized to an external clock 130, such as a GPS (Global Positioning System) or a BITS (Building Integrated Timing System), or it can simply run off its internal timing source.

The structure of the Heartbeat tree (i.e., its branches) are determined by the proximity (number of hops) of each SSR and each SEP to the Master SSR. The path to each SSR or SEP from the Master should comprise a minimum number of hops. On the tree, Heartbeats flow from the Master SSR to each SSR and SEP, synchronizing all the SSRs and SEPs to the Master SSR frequency reference, based on the frequency of arriving Heartbeats, i.e. based on the time period between Heartbeats. Although Heartbeats are sent on every scheduled port, only Heartbeats on the tree are used to synchronize SSRs and SEPs. Non-Master SSRs and SEPs synchronize the frequency of their internal frequency references to the incoming Heartbeats received on the designated port of the Heartbeat tree. The timing references of non-Master SSRs and SEPs are allowed to have any phase relative to the Master SSR, but once frequency-synchronized, this relative phase is locked to the Master SSR phase (i.e., the relative phase is constant). This frequency synchronization can be done using a variety of feedback mechanisms, such as digital phase-locked loops. Other mechanisms are well within the capability of those skilled in the art.

Figure 2:
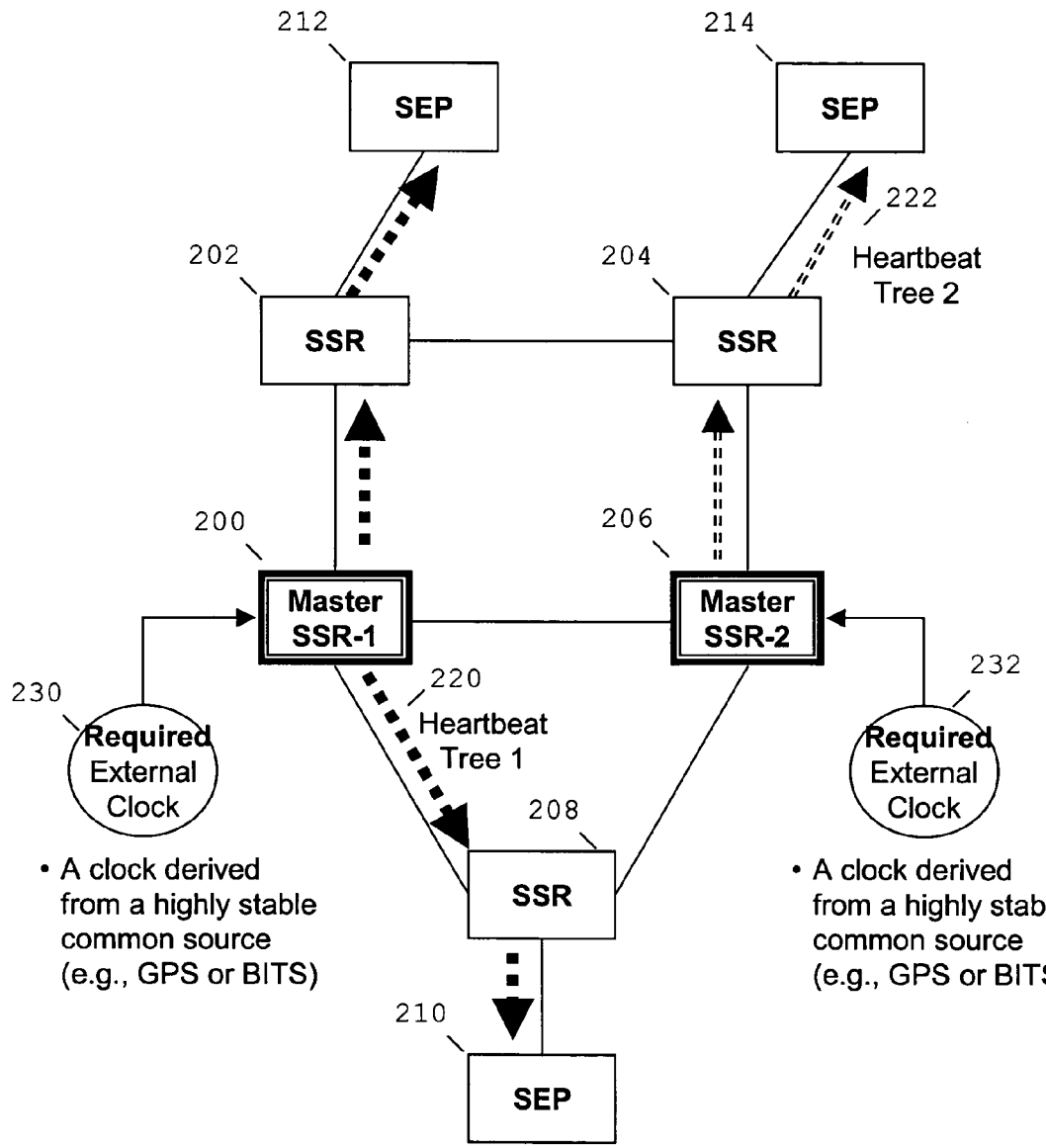
FIG. 2 is a block diagram showing an example of a heartbeat distribution tree having two Master SSRs, in accordance with an illustrative embodiment of the disclosed system.

It is possible to designate more than one SSR as a Master for Heartbeat distribution. Multiple non-intersecting Heartbeat trees are determined, with a Master as the root of each tree. Since each Master, and its tree, operates independently, each Master should be synchronized to an external timing reference derived from a highly stable common source, such as a GPS or BITS. An example network diagram with two Master SSRs is shown in FIG. 2, including master SSRs 200 and 206, non-master SSRs 202, 204 and 208, SEPs 210, 212 and 214, required external clocks 230 and 232, and heartbeat trees 220 and 222.

If any link of the Heartbeat tree fails, the SSR or SEP that was deriving Heartbeat timing from a port connected to that link transitions to a holdover mode. Downstream SSRs or SEPs continue to derive Heartbeat timing from their respective branches of the tree. The Heartbeat tree is modified as soon as possible to use other operational links, to ensure all nodes stay frequency-synchronized to a Master SSR.

Each SSR or SEP frequency reference has an arbitrary phase offset from the master SSR frequency reference, even though the frequencies of each reference are synchronized. There is no need to phase-align the timing references in each SSR or SEP. Instead, a phase calculation is determined on each link between SSRs or SEPs (in each direction).

2. Link Phase Calculation

The final synchronization step is to determine the phase of each scheduled link (the Link Phase). The determined Link Phase is the relative displacement of heartbeat packet arrival times at specific input ports. Once the Link Phase is known, the packet arrival times on any link from Point A to Point B can be calculated using the transmission time at Point A.

As previously noted, once Frequency Synchronization has been achieved, each SSR and each SEP independently generates heartbeat packets at the frequency determined during Frequency Synchronization. Accordingly, received heartbeat packets are not forwarded. Specifically, each SSR and each SEP transmits these Heartbeats on all scheduled ports in accordance with the frequency determined during Frequency Synchronization. A scheduled port is a port that: 1) supports scheduled packets and 2) has been determined to be connected to another port that supports scheduled packets. Heartbeats are transmitted on all ports of a node at the same time.

The Link Phase of a Link from Point A to Point B is calculated by the receiver (an SSR or SEP) at point B and is equal to the arrival time of Point A's Heartbeat minus the time of Point B's last generated Heartbeat.

$$\text{LinkPhase}_{AB} = \text{Heartbeat\_Time}_{AB} - \text{Heartbeat\_Time}_B \quad (1)$$

where Heartbeat_Time$_{AB}$ is the arrival time of a Heartbeat packet at Point B (SSR-B or SEP-B) that was transmitted from Point A (SSR-B or SEP-A), and Heartbeat_Time$_B$ is the transmit time of the Heartbeat at Point B that was transmitted at or before the arrival time of the Heartbeat packet from Point A.

Since the time between Heartbeats on all SSRs and SEPs is the same (because they are synchronized in frequency), the Link Phase of any link is in the range [0-T], where T is the time interval between Heartbeats.

The Link Phase in the opposite direction, from Point B to Point A, uses a similar formula but in general produces a different result than the Link Phase of the link in the direction from Point A to Point B:

$$\text{LinkPhase}_{BA} = \text{Heartbeat\_Time}_{BA} - \text{Heartbeat\_Time}_A \quad (2)$$

Figure 3:
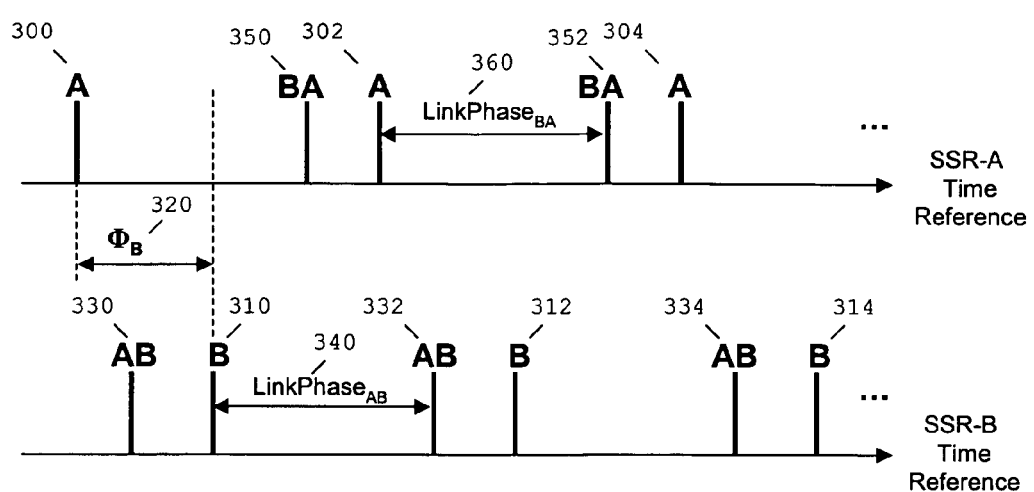
FIG. 3 illustrates calculation of Link Phase for an illustrative embodiment of the present invention.

FIG. 3 illustrates an example of the Link Phase calculation between two SSRs. FIG. 3 shows the times 300, 302, and 304 at which a heartbeat packet is periodically transmitted by SSR-A, the times 310, 312 and 314 at which a heartbeat packet is periodically transmitted by SSR-B, arrival times 330, 332, and 334 of heartbeat packets transmitted by SSR-A to SSR-B, arrival times 350 and 352 of heartbeat packets transmitted by SSR-B to SSR-A, the Link Phase 340 from SSR-A to SSR-B, and the Link Phase 360 from SSR-B to SSR-A.

Assume that SSR-A is the Master SSR. The phase offset of SSR-B (compared to the SSR-A Master) is arbitrary, and is shown as $\Phi_B$ 320, which can be measured in phase (0 to 360 degrees) or measured in terms of the Heartbeat period (0 to T, where T is the time interval between Heartbeats). The value of $\Phi_B$ does not need to be determined.

The Link Phase is calculated in the same manner by each receiving SSR, regardless of the phase relationship of SSR or SEP Heartbeat timing references at either end of the link.

It is not necessary to know the propagation delay (Delay) of any link in order to determine the Link Phase. Link Phase is, however, related to Delay. The formula relating Link Phase and Delay on a link from a Master SSR at point A to an SSR or SEP at point B is:

$$\text{LinkPhase}_{AB} = (\text{Delay}_{AB} - \Phi_B) \bmod_T \quad (3)$$

$$\text{LinkPhase}_{BA} = (\text{Delay}_{BA} + \Phi_B) \bmod_T \quad (4)$$

Note: "mod" is the modulo function. The equation "y=x mod$_T$" yields a value such that y<T, and (x−y) is divisible by T. The result of this modulo function is expressed as a value in the range [0-T] using the time reference of the SSR or SEP performing the calculation. For LinkPhase$_{AB}$, the SSR-B receiver performs the Link Phase calculation. For LinkPhase$_{BA}$, the SSR-A (Master SSR) receiver performs the Link Phase calculation.

Since the value of $\Phi_B$ (the phase of the timing reference at point B) is unknown and arbitrary, it is not possible to determine the one-way propagation delay of individual links using the present invention. However, the round-trip delay (Delay$_{AB}$+Delay$_{BA}$) can be determined if it is known to be less than T, the time interval between Heartbeats.

Figure 4:
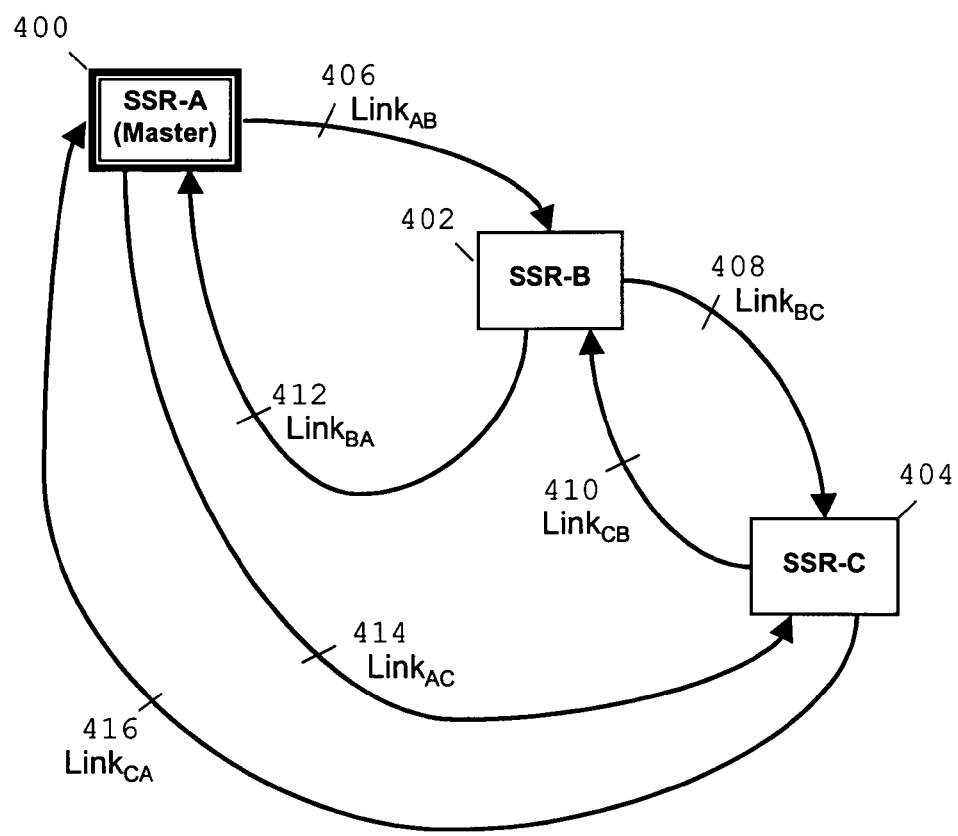
FIG. 4 illustrates operation of the disclosed invention in a network including three SSRs, all interconnected with direct connections.

Those skilled in the art can determine that Equation (3) and Equation (4) can be combined to yield:

$$(\text{Delay}_{AB,BA}) \bmod_T = (\text{LinkPhase}_{AB} + \text{LinkPhase}_{BA}) \bmod_T \quad (5)$$

where Delay$_{AB,BA}$ (the round-trip delay between point A and point B)=Delay$_{AB}$+Delay$_{BA}$ To further illustrate the present invention, consider the case where there are three SSRs, all inter-connected with direct connections. This is illustrated by FIG. 4, which shows a configuration of three interconnected switches 400, 402 and 404, where switch SSR-A 400 is connected to switch SSR-B 402 via links 406 and 412, switch SSR-B is connected to switch SSR-C via links 408 and 410, and switch SSR-C 404 is connected to switch SSR-A via links 414 and 416. The links in FIG. 4 may have unequal delays between the respective switches they connect. The Link Phase on each link is calculated by using equations equal or similar to Equations (1) and (2):

$$\text{LinkPhase}_{AB} = \text{Heartbeat\_Time}_{AB} - \text{Heartbeat\_Time}_B \quad (6)$$

$$\text{LinkPhase}_{BA} = \text{Heartbeat\_Time}_{BA} - \text{Heartbeat\_Time}_A \quad (7)$$

$$\text{LinkPhase}_{AC} = \text{Heartbeat\_Time}_{AC} - \text{Heartbeat\_Time}_C \quad (8)$$

$$\text{LinkPhase}_{CA} = \text{Heartbeat\_Time}_{CA} - \text{Heartbeat\_Time}_A \quad (9)$$

$$\text{LinkPhase}_{BC} = \text{Heartbeat\_Time}_{BC} - \text{Heartbeat\_Time}_C \quad (10)$$

$$\text{LinkPhase}_{CB} = \text{Heartbeat\_Time}_{CB} - \text{Heartbeat\_Time}_B \quad (11)$$

The round-trip delay, if known to be less than T, can be calculated between each pair SSRs. Once again, assume that SSR-A is the master. SSR-B has a phase offset, $\Phi_B$. Likewise, SSR-C has an arbitrary clock offset, $\Phi_C$, so the resulting relationships among the Link Phases and the Delays are:

$$\text{LinkPhase}_{AB} = (\text{Delay}_{AB} - \Phi_B) \bmod_T \quad (12)$$

$$\text{LinkPhase}_{BA} = (\text{Delay}_{BA} + \Phi_B) \bmod_T \quad (13)$$

$$\text{LinkPhase}_{AC} = (\text{Delay}_{AC} - \Phi_C) \bmod_T \quad (14)$$

$$\text{LinkPhase}_{CA} = (\text{Delay}_{CA} + \Phi_C) \bmod_T \quad (15)$$

$$\text{LinkPhase}_{BC} = (\text{Delay}_{BC} + \Phi_B - \Phi_C) \bmod_T \quad (16)$$

$$\text{LinkPhase}_{CB} = (\text{Delay}_{CB} - \Phi_B + \Phi_C) \bmod_T \quad (17)$$

Those skilled in the art can combine Equations (12) and (13), Equations (14) and (15) and Equation (16) and (17) to relate round-trip delay and Link Phase:

$$(\text{Delay}_{AB,BA}) \bmod_T = (\text{LinkPhase}_{AB} + \text{LinkPhase}_{BA}) \bmod_T \quad (18)$$

$$(\text{Delay}_{AC,CA}) \bmod_T = (\text{LinkPhase}_{AC} + \text{LinkPhase}_{CA}) \bmod_T \quad (19)$$

$$(\text{Delay}_{BC,CB}) \bmod_T = (\text{LinkPhase}_{BC} + \text{LinkPhase}_{CB}) \bmod_T \quad (20)$$

Figure 5:
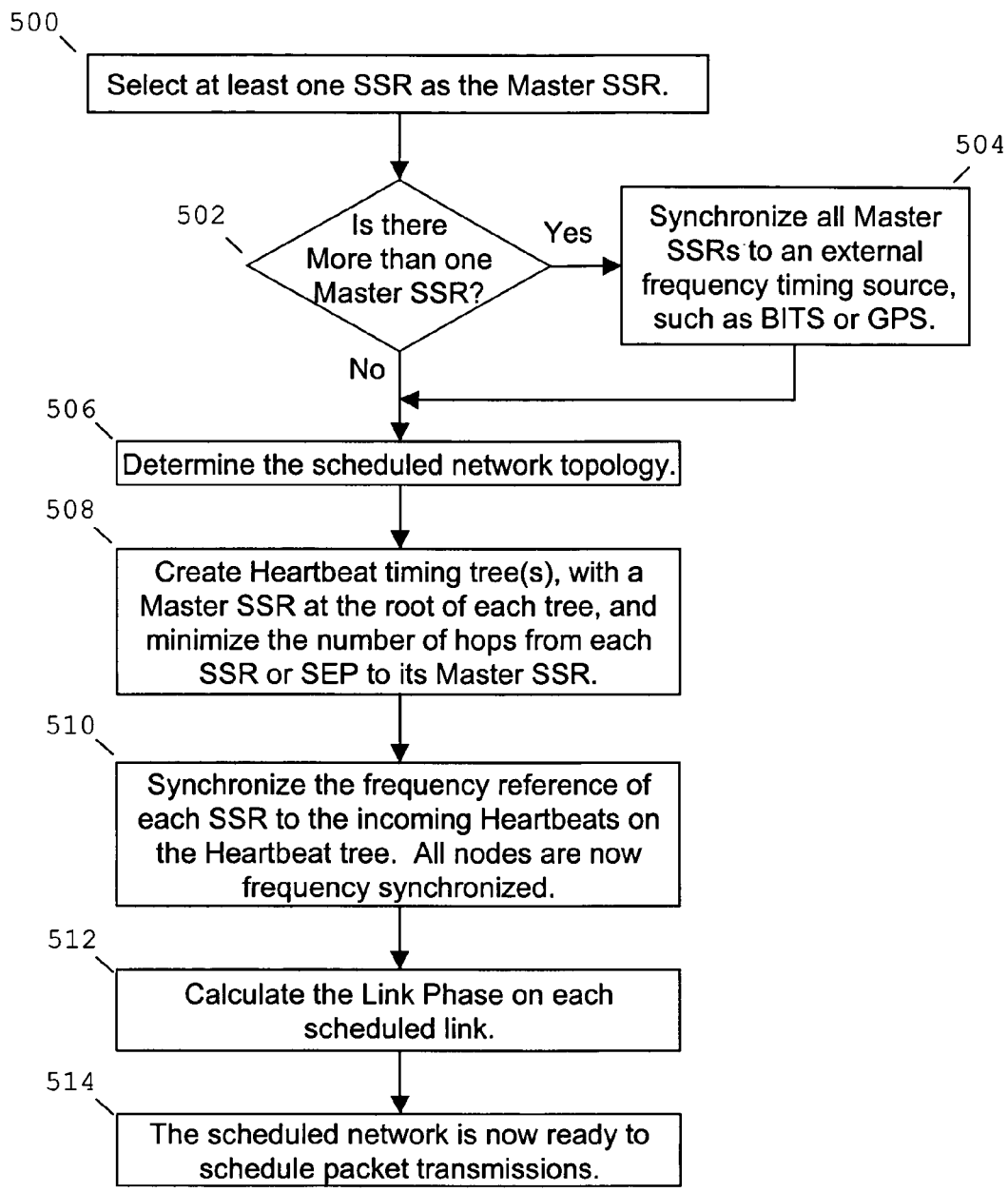
FIG. 5 is a simplified flow chart showing operation of an illustrative embodiment of the present invention.

FIG. 5 is a simplified flow chart showing operation of an illustrative embodiment of the present invention. At 500, at least one SSR is selected as a Master SSR. At 502, if there exists more than one Master SSR, control passes to 504, otherwise control passes to 506. At 504, all Master SSRs are synchronized to an external frequency timing source, such as a BITS or GPS. At 506, the scheduled network topologies are determined. At 508, a Heartbeat timing tree is created for each Master SSR. The root of each tree is one of the master SSRs. The number of hops from each SSR or SEP to its respective Master SSR is minimized. At 510, the frequency reference of each SSR is synchronized to the incoming Heartbeats. As a result, all nodes are frequency-synchronized. At 512, the Link Phase on each scheduled link is calculated. At 514, the scheduled network is ready to schedule packet transmissions.

Figure 6:
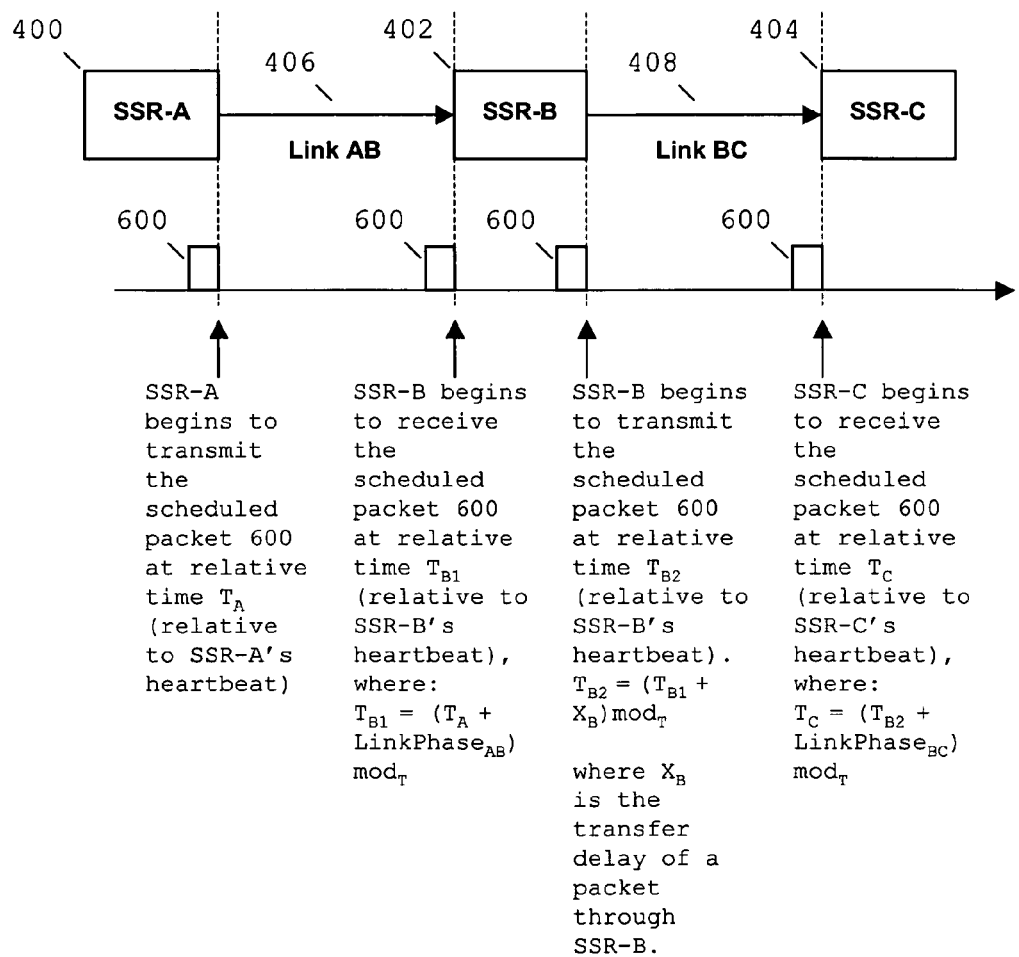
FIG. 6 illustrates application of a calculated Link Phase to a packet schedule.

An illustrative example of a scheduled packet 600 passing from one SSR to another SSR via a third SSR is shown in FIG. 6, with reference to the switches 400, 402 and 404 and links 406 and 408 shown in FIG. 4. Once the SSRs are frequency-synchronized and all Link Phases are calculated, scheduled packets may commence.

In this example, SSR-A transmits a scheduled packet at relative time $T_A$ (relative to SSR-A's heartbeat). This packet begins to arrive at SSR-B at relative time $T_{B1}$ (relative to SSR-B's heartbeat), where $$T_{B1} = (T_A + \text{LinkPhase}_{AB}) \bmod_T \quad (21)$$

SSR-B begins to transmit this scheduled packet at relative time $T_{B2}$ (relative to SSR-B's heartbeat).

$$T_{B2} = (T_{B1} + X_B) \bmod_T = (T_A + X_B + \text{LinkPhase}_{AB}) \bmod_T \quad (22)$$

where $X_B$ is the transfer delay of a packet through SSR-B.

SSR-C begins to receive this scheduled packet at relative time $T_C$ (relative to SSR-C's heartbeat), where:

$$T_C = (T_{B2} + \text{LinkPhase}_{BC}) \bmod_T \quad (23)$$

It should be appreciated that modifications to and variations of the above-described methods and system may be made without departing from the inventive concepts disclosed herein. Accordingly, the invention is not to be viewed as limited except by the scope and spirit of the appended claims.

What is claimed is:

1. A method of synchronizing at least one node in a real-time scheduled packet network, comprising:
   transmitting first heartbeat packets at a predetermined frequency to the at least one node;
   receiving the first heartbeat packets at the at least one node;
   synchronizing an internal frequency reference in each of the at least one node according to at least two of the received first heartbeat packets; and calculating a link phase of a link over which the heartbeat packets are received by the at least one node by subtracting a time at which the node transmitted a second heartbeat packet from a time at which the node received a first heartbeat packet, wherein the link phase from a first node to a second node is different than a link phase from said second node to said first node, wherein said link phase from said first node to said second node is determined in accordance with at least one of the group consisting of the formula:

$$\text{LinkPhase}_{AB} = (\text{Delay}_{AB} - \Phi_B) \bmod_T$$

wherein $\text{Delay}_{AB}$ is the propagation delay of the link from the first node (A) to the second node (B), $\Phi_B$ is the phase offset of the second node, and $\bmod_T$ is the time interval between heartbeats, and $$\text{LinkPhase}_{BA} = (\text{Delay}_{BA} + \Phi_B) \bmod_T$$

wherein $\text{Delay}_{BA}$ is the propagation delay of the link from the second node (B) to the first node (A), $\Phi_B$ is the phase offset of the second node, and $\bmod_T$ is the time interval between heartbeats.

2. A system for synchronizing a real-time scheduled packet network, comprising:
   a master node;
   at least one synchronized node; and
   a respective link between the master node and each of the at least one synchronized node; wherein:
   the master node is configured to transmit first heartbeat packets via the respective link to the at least one synchronized node at a predetermined frequency; and
   the at least one synchronized node is configured to:
      receive the first heartbeat packets;
      synchronize an internal frequency reference according to at least two of the received first heartbeat packets; and
   calculate a link phase of the respective link by subtracting a time at which the synchronized node transmitted a second heartbeat packets to another node from a time at which the synchronized node received a first heartbeat packets from the master node wherein the link phase from a first node to a second node is different than a link phase from said second node to said first node, wherein said link phase from said first node to said second node is determined in accordance with at least one of the group consisting of the formula:

$$\text{LinkPhase}_{AB} = (\text{Delay}_{AB} - \Phi_B) \bmod_T$$

wherein $\text{Delay}_{AB}$ is the propagation delay of the link from the first node (A) to the second node (B), $\Phi_B$ is the phase offset of the second node, and $\bmod_T$ is the time interval between heartbeats, and $$\text{LinkPhase}_{BA} = (\text{Delay}_{BA} + \Phi_B) \bmod_T$$

wherein $\text{Delay}_{BA}$ is the propagation delay of the link from the second node (B) to the first node (A), $\Phi_B$ is the phase offset of the second node, and $\text{mod}_T$ is the time interval between heartbeats.

3. The method of claim 1 wherein said transmitting first heartbeat packets at a predetermined frequency to the at least one node comprises transmitting from a master node.

4. The method of claim 1 further comprising providing a heartbeat tree for distributing said heartbeat packets to said at least one node.

5. The method of claim 4 wherein said master node comprises a root of said heartbeat tree.

6. The method of claim 4 further comprising determining a failed link in said heartbeat tree by a node of said at least one node.

7. The method of claim 6 further comprising, upon determining a failed link, transitioning to holdover mode by said node that determined a failed link.

8. The method of claim 7 further comprising modifying said heartbeat tree to utilize other operational links to maintain synchronization of said node that determined said failed link.

9. The system of claim 2 wherein a heartbeat tree is provided for distributing said heartbeat packets to said at least one node.

10. The system of claim 9 wherein said master node comprises a root of said heartbeat tree.

11. The system of claim 9 wherein a failed link in said heartbeat tree is determined by a node of said at least one node.

12. The system of claim 11 wherein, upon determining a failed link, said node that determined a failed link transitions to holdover mode.

13. The system of claim 12 wherein said heartbeat tree is modified to utilize other operational links to maintain synchronization of said node that determined said failed link.

* * * * *